United States Patent Office 2,734,079
Patented Feb. 7, 1956

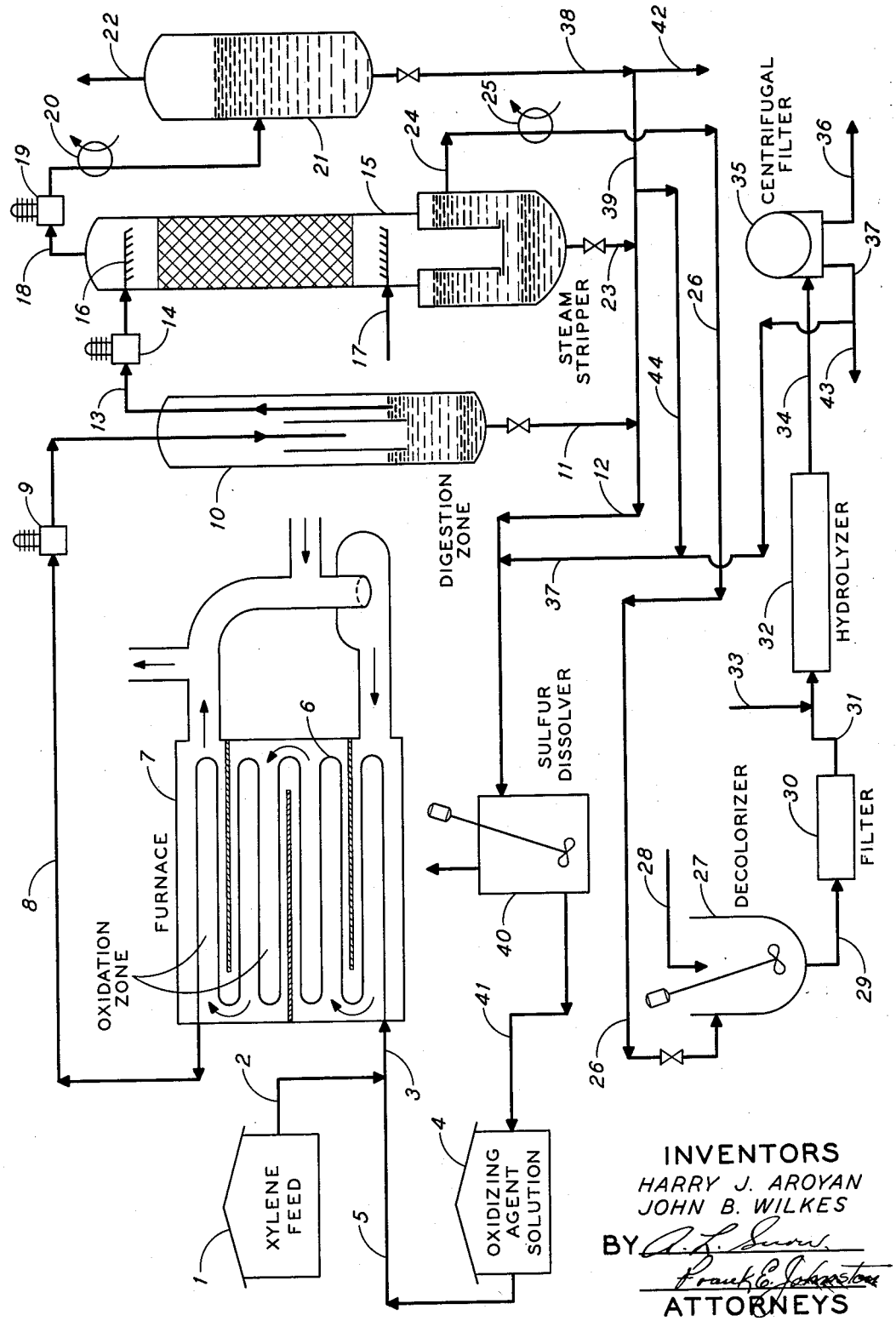

2,734,079

PROCESS OF PRODUCING PHTHALIC ACIDS

Harry J. Aroyan, El Cerrito, and John B. Wilkes, Albany, Calif., assignors to California Research Corporation, San Francisco, Calif., a corporation of Delaware Application December 30, 1953, Serial No. 401,352

6 Claims. (Cl. 260—515)

This invention relates to a process for producing phthalic acids by oxidizing xylenes.

It has recently been learned that xylenes can be converted to phthalic acids by oxidizing xylenes with water, ammonium sulfate and an inorganic sulfur compound containing sulfur at a valence below plus 6 by heating a mixture of these materials to a temperature in the range from about 550° F. to 700° F. and under a pressure sufficient to maintain a part of the water in liquid phase, to produce a reaction product comprising phthalic acid amides and ammonium salts, and then hydrolyzing the reaction product to liberate phthalic acids. The inorganic sulfur compound is preferably a water-soluble sulfide such as a hydrogen sulfide, ammonium sulfide or ammonium polysulfide. However, elemental sulfur, sulfur dioxide, water-soluble sulfites and water-soluble thiosulfates, and the like, may be employed in the reaction as the sulfur material containing sulfur at a valence below plus 6.

The net reaction when xylenes are oxidized is shown by the following equation:

$$\phi(CH_3)_2 + 1.5(NH_4)_2SO_4 \longrightarrow$$
$$1.5H_2S + 2H_2O + NH_3 + \phi(COONH_4)_2$$

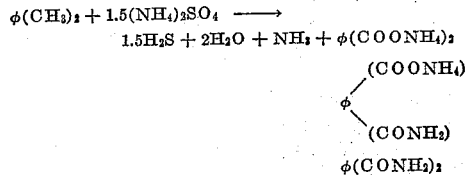

$$\phi(CONH_2)_2$$

The mixture of ammonium phthalate, ammonium phthalate monoamide and phthalic diamide aggregates 1 mole in the above equation, while one additional mole of water is formed for each equivalent of amide formed in lieu of ammonium salts.

As indicated by the above equation, 1.5 moles of ammonium sulfate are required to oxidize 1 mole of xylene to a phthalic acid product (i. e., 0.75 mole of sulfate oxidizes one methyl group to a carboxyl group). A molar excess of ammonium sulfate is desirably employed and ordinarily from about 1.55 moles to 1.75 moles of ammonium sulfate are charged to the reaction for each mole of xylene fed. Xylene feeds may commonly contain up to 10% of paraffinic hydrocarbons and, where paraffins are present, larger amounts of ammonium sulfate will be required to achieve complete conversion of the xylene, since the paraffin oxidation consumes a relatively larger amount of oxidizing agent.

While the above equation does not show water as a material participating in the reaction, the presence of water in considerable amount is necessary for good conversions and yields. For good operation it is desirable to charge at least 25 moles of water per mole of organic compound to the reaction zone. 30 to 60 moles of water per mole of hydrocarbon facilitate good conversions and yields. Even larger amounts of water may be employed, the only adverse effect being that a larger proportion of the available reaction space is occupied by the water so that the throughput of feed per unit volume of reaction space is lower.

The addition of a sulfur compound having sulfur at a valence below plus 6 to the reaction mixture serves to increase the rate of reaction. The effective oxidizing agent of course is the sulfate ion, but its effectiveness, especially from the standpoint of rate, is markedly increased by the presence of a sulfur compound containing sulfur at a valence below plus 6, e. g., a sulfide. The amount of sulfide charged to the reaction zone is desirably in the range from 0.05 to 0.3 mole per mole of organic compound, and preferably in the range from 0.2 to 0.25 mole per mole of organic feed. Optimum proportions of reactants when a substantially pure xylene is being oxidized are 1.6 to 1.7 moles of ammonium sulfate per mole of xylene, 30 to 40 moles of water per mole of xylene, and 0.2 to 0.3 mole of sulfide or polysulfide per mole of xylene. When the sulfide employed is ammonium polysulfide, about .25 mole of ammonium polysulfide containing about .38 gram atom of sulfur per mole of xylene appears to be optimum.

When it is attempted to adapt the above-described process to the oxidation of xylenes with a view to the production of phthalic acids, it has been found that if reasonable conversions and yields are to be obtained, the reaction should be conducted at a temperature preferably from about 620° F. to 650° F. and under a pressure in the range from about 2000 to 4000 p. s. i. g. The ammonium sulfate is employed in at least stoichiometric amounts, as indicated by the above equation, about 30 to 35 moles of water are employed per mole of xylene charge, and a small amount of a sulfide or other sulfur material containing sulfur at a valence below plus 6 is introduced to speed up the oxidation reaction. The reaction is preferably conducted in a continuous manner by passing the reactant mixture through a tubular reaction zone maintained at a temperature above about 620° F. and of sufficient length to permit a residence time in the range from about 20 minutes to 1 hour in the reaction zone when the reactants are being passed through that zone at a rate sufficiently high to provide reasonably good agitation. By operating in this manner substantially complete conversion of the xylenes is obtained. The xylenes are converted primarily to phthalic acid derivatives which appear in the reaction product as amides and ammonium salts of phthalic acids. The mixture of amides and ammonium salts of phthalic acids produced contains diamides of phthalic acids, monoamides of phthalic acids, in which one carboxyl group of the phthalic acid is converted to an amide and the other carboxyl group is converted to an ammonium salt, and diammonium phthalates. The amide-salt reaction product mixture is then hydrolyzed usually by heating with aqueous sulfuric acid to produce phthalic acids. While the reactions involved in the conversion are relatively clean-cut and phthalic acids may be readily obtained in high yields, as indicated in copending Toland application Serial No. 371,209, there are some side reactions and the crude reaction product mixture effluent from the tubular reaction zone is quite dark in color. It is found that if the crude reaction product is directly subjected to hydrolysis, the phthalic acid product is poor in color and that treatment of this colored product to reach the high purity required in the usual end uses of the phthalic acids, i. e., alkyd resin manufacture and synthetic fiber manufacture, is difficult and expensive. Accordingly, it is desirable to decolorize the crude reaction product before subjecting it to hydrolysis to produce phthalic acids. This can be accomplished by passing through a bed of solid adsorbent or by mixing the crude reaction product with a solid adsorbent, preferably activated charcoal, and filtering the mixture at a temperature which is desirably in the range from 150 to 250° F. If the carbon treatment and filtration are conducted at temperatures below about 150° F., the rate of adsorption of the color bodies present in the crude reaction product by the adsorbent is low, and if temperatures above about 250° F. are employed, the activity of the adsorbent appears to decline quite noticeably.

While production of phthalic acids by the above-described method, i. e., oxidation of a xylene with water, ammonium sulfate and a sulfide, decolorization of the crude reaction product with activated charcoal and hydrolysis of the decolorized product, results in a completely satisfactory phthalic acid product, a difficulty is encountered in this operation which has very serious commercial implications. Upon checking the potential phthalic acid content of the crude reaction product effluent from the reaction zone against the quantity of phthalic acid actually recovered after decolorization and hydrolysis, a discrepancy ranging from about 7% to about 17% was consistently observed. This is to say that during the decolorization and hydrolysis steps a very substantial proportion of the available phthalic acid was lost. It was found that the filter cake produced during the decolorization step by mixing activated charcoal with the crude reaction product and filtering the resultant mixture contained substantially all of the phthalic acid which was apparently lost during the processing of the crude reaction product to produce high purity phthalic acid. While treatment of this filter cake to recover the phthalic acid values may be possible, such treatment would be extremely difficult since it would involve dissolving the phthalic acid values from the filter cake and this dissolving would be accompanied by an appreciable dissolving of the color bodies contained therein which would require further treatment with charcoal and further loss to a second filter cake, etc.

It is an object of this invention to provide a method for substantially completely eliminating the loss of phthalic acid values from the crude reaction product during decolorization with a solid adsorbent.

Pursuant to the invention, phthalic acids are produced at high conversions and yields by heating a xylene with water, ammonium sulfate and an inorganic sulfur compound containing sulfur at a valence below plus 6 to a temperature in the range from 550° F. to 700° F. to produce a reaction product comprising phthalic acid amides and ammonium salts, digesting the reaction product mixture as such or with additional water at about 450° F. to 630° F. for at least 2 minutes and then decolorizing the reaction product by mixing it with a solid adsorbent and filtering the mixture or passing it through a bed of solid adsorbent, and hydrolyzing the decolorized product to produce phthalic acids. While digestion for at least two minutes is necessary to produce an appreciable change in the reaction mixture, somewhat longer times are ordinarily employed as indicated in the data tabulated below, but the digestion period will not ordinarily exceed thirty minutes. Preferably, the digestion zone is held at a temperature from about 475° F. to 550° F. The pressure maintained in the digestion zone is at or somewhat above the pressure of steam in equilibrium with water at digestion temperature, but not more than 800 pounds per square inch above the equilibrium steam pressure. At 450° F. the pressure in the digestion zone may be from about 200 to 500 pounds per square inch above equilibrium steam pressure and at 630° F. the pressure may be from 600 to 800 pounds per square inch above equilibrium steam pressure. For example, at 450° F. digestion temperature the total pressure is desirably from 600 to 1000 p. s. i. g.; at 500° F. the total pressure is desirably from 800 to 1200 p. s. i. g.; at 550° F. the total pressure is desirably from 1100 to 1600 p. s. i. g.; and at 600° F. the total pressure is desirably from about 1550 to 2300 p. s. i. g. When the decolorization step is preceded by digestion in this manner, it is found that substantially all of the phthalic acid values contained in the crude reaction product are recovered as substantially pure phthalic acid. The process above described is especially adapted to the production of isophthalic acid and terephthalic acid, or mixtures of these two acids, by oxidizing meta-xylene, para-xylene, or mixtures of meta- and para-xylene, respectively, and then purifying and hydrolyzing the crude reaction product. The process is also well adapted to the production of 5-t-butyl isophthalic acid by oxidizing 5-t-butyl meta-xylene.

The process of the invention will be better understood by reference to the appended drawing which is a diagrammatic illustration of apparatus and process flow suitable for the practice of the invention.

The xylene feed is pumped from tank 1 through line 2 into line 3. The oxidizing agent solution (aqueous ammonium sulfate containing a small amount of ammonium polysulfide) is pumped from storage tank 4 through line 5 into line 3 where it mixes with the xylene. The mixture of xylene and oxidizing agent passes through coil 6 in the interior of furnace 7. This coil constitutes the preheater and oxidizing zones. The furnace is operated so as to maintain the reactant mixture in the interior of coil 6 at a temperature of about 630° F. The crude reaction product passes from coil 6 through line 8 and pressure reduction valve 9 into digestion zone 10. Pressure reduction valve 9 reduces the pressure of the crude reaction product mixture from about 3000 p. s. i. g. to approximately 1000 p. s. i. g. Digestion zone 10 operates at 475 to 500° F. and about 1000 p. s. i. g. The crude reaction product desirably has a residence time in digestion zone 10 of 10 to 15 minutes. Liquid sulfur accumulates in the bottom of digestion zone 10 and is withdrawn either continuously or periodically through line 11 and passed into line 12. The digested reaction product is withdrawn from digestion zone 10 through line 13 and passed through pressure reduction valve 14 into steam stripper 15. Pressure reduction valve 14 reduces the pressure on the digested reaction product from about 1000 p. s. i. g. to about 60 p. s. i. g. The digested crude reaction product is sprayed from nozzle 16 onto the surface of packing material such as Raschig rings in the interior of stripper 15. Steam is introduced into stripper 15 through line 17 and traverses the packing in the interior of the stripper countercurrently to the reaction product. Ammonia, hydrogen sulfide, carbon dioxide and water vapor are withdrawn from stripper 17 through line 18 and passed through pressure reduction valve 19. Pressure reduction valve 19 reduces the pressure of the vapors stripped from the reaction product from 60 pounds gauge to atmospheric. The vapors under reduced pressure are passed through head exchanger 20 where they are cooled to approximately atmospheric temperature. The condensate is collected in tank 21. Fixed gases are withdrawn from tank 21 through vent line 22. Liquid sulfur accumulates in the bottom of stripper 15 and is withdrawn through line 23 and passed into line 12. The stripped reaction product is withdrawn from stripper 15 through line 24, passed through heat exchanger 25 where it is cooled to about 200° F. and then through line 26 into tank 27. Activated charcoal is introduced into tank 27 through line 28. The stripped reaction product and the activated charcoal are intimately mixed in tank 27. The mixture is withdrawn from tank 27 through line 29 and passed through filter 30 where the activated charcoal and adsorbed color bodies are removed. The filtrate passes from filter 30 through line 31 into hydrolyzer 32. Sulfuric acid is introduced through line 33 into line 31 and flows into the hydrolyzer with the decolorized reaction product. The hydrolyzer is desirably operated at 400 to 550° F. and at a pressure of 250 to 1000 p. s. i. g. In hydrolyzer 32 phthalic acid amides and ammonium phthalates are converted to phthalic acids and ammonium sulfate. The hydrolyzed reaction product is passed from hydrolyzer 32 through line 34 into centrifugal filter 35. Phthalic acid is withdrawn from centrifugal filter 35 through line 36. The filtrate consisting predominantly of water, ammonium sulfate and sulfuric acid is withdrawn from centrifugal filter 35 through line 37. Aqueous ammonium sulfide is withdrawn from tank 21 through line 38 and part passed through line 39 into line 12 and thence into sulfur dissolver 40, while the rest is passed through line 44 into line 37 to neutralize sulfuric acid. In line 12 liquid sulfur removed from digestion zone 10 and stripping zone 15 is dissolved in the ammonium sulfide coming from tank 21. A mixture of aqueous ammonium sulfate containing a small amount of ammonium polysulfide is removed from sulfur dissolver 40 through line 41 and is passed into tank 4 for use in oxidizing further quantities of xylene. Small amounts of ammonia, ammonium polysulfide or ammonium sulfate can be introduced into sulfur dissolver 40 in order to maintain the composition of the oxidizing solution reasonably constant. If circumstances require, ammonium sulfide can be withdrawn from the system through line 42 or ammonium sulfate can be withdrawn from the system through line 43 to facilitate the maintenance of constant composition in the oxidizing solution.

A run of 400 hours' duration was made in a pilot scale oxidizing unit corresponding in substance to that illustrated in the drawing. The xylene feed charged during the run contained 4% ortho-xylene, 75.8% meta-xylene, 12.1% para-xylene, 7.1% ethylbenzene and 1% non-aromatic hydrocarbons. During the run the oxidizing mixture had a content of ammonium sulfate which varied from 24.28% by weight to 26.73% by weight, an ammonia content which varied from 0.91 to 1.09% by weight, a hydrogen sulfide content which varied from 0.83 to 1.40% by weight and a free sulfur content which varied from 1.25 to 1.65% by weight. The remainder of the oxidizing mixture throughout was water. The ammonia, hydrogen sulfide and free sulfur components of the oxidizing solution were actually present in the form of ammonium polysulfide. The oxidizing mixture and xylene feed were charged to the reactor in proportions such that the mole ratio of water to xylene in the reaction zone ranged from 32.0–39.7:1 during the run. The temperature in the reaction zone during the run was in the range from 626° F. to 635° F. The pressure in the oxidation zone during the run was held in the range from 2900 to 3000 p. s. i. g. The space velocity during the run was in the range from 0.126 to 0.197 volume of hydrocarbon feed per volume of reactor space per hour. During the run samples of the crude reaction product were removed, treated with activated charcoal, and filtered without the digestion step above described. Treatment in this manner resulted in losses of phthalic acid to the filter cake ranging from 8 to 14% of the total phthalic acid available in the crude reaction product. The remainder of the crude reaction product was passed into the digestion zone which was operated at 950 to 1100 p. s. i. g. and 472 to 525° F. during the run. The residence time of the reaction product in the digestion zone was generally from 12 to 15 minutes. Tests were made throughout the run to determine the per cent of phthalic acid values contained in the crude reaction product which were lost to the filter cake when operating in this manner. The results of these tests are reported in the following table.

Table

| Test Period | Hours on Stream | Digestion Zone Operating Conditions | | | Max. Product Losses to Carbon Cake Mole Percent |
|---|---|---|---|---|---|
| | | Temp., °F. | Press., p. s. i. g. | Residence Time, min. | |
| 1 | 15 | 482 | 1,000 | 14.3 | 0.5 |
| 2 | 19 | 486 | 1,000 | 14.2 | 0.5 |
| 3 | 31 | 490 | 1,000 | 13.3 | 0.4 |
| 4 | 35 | 489 | 1,000 | 13.4 | 0.4 |
| 5 | 43 | 495 | 1,000 | 13.4 | 0.5 |
| 6 | 51 | 492 | 1,000 | 13.5 | 0.4 |
| 7 | 72 | 495 | 1,000 | 13.3 | 0.4 |
| 8 | 103 | 496 | 1,000 | 13.3 | 0.4 |
| 9 | 119 | 495 | 1,000 | 13.0 | 0.4 |
| 10 | 195 | 497 | 1,000 | 11.4 | 0.4 |
| 11 | 239 | 500 | 1,000 | 11.3 | 0.3 |
| 12 | 276 | 490 | 1,000 | 13.0 | 0.3 |
| 13 | 292 | 488 | 1,000 | 14.2 | 0.5 |
| 14 | 377 | 502 | 1,000 | 13.5 | 0.3 |
| 15 | 385 | 502 | 1,000 | 13.3 | 0.4 |

From the data above tabulated, it will be seen that a remarkable reduction in phthalic acid product losses is effected by the digestion step. Where the crude reaction product is treated with activated carbon and filtered without previous digestion, 8 to 14% of the total available phthalic acid was lost to the filter cake, while the losses to the filter cake when the carbon treatment and filtration were preceded by the digestion treatment attained a maximum of 0.5%.

Where higher temperature digestion is employed, the time necessary to reduce loss of phthalic acid values is considerably shortened and is of the order of one minute at 630° F. and from 2 to 4 minutes at 550° F.

The effectiveness of the digestion treatment to accomplish the desired reduction in phthalic acid lost to the filter cake is clear from the data above presented. The manner in which the digestion treatment accomplishes this reduction is not entirely clear. There is frequently no solid phase present in the crude reaction product at the temperature at which it is treated with activated carbon and filtered, i. e., at 150 to 250° F. Apparently some of the phthalic acid derivatives contained in the crude reaction product come out of solution during the contact with the carbon and are retained as solids on the filter cake. The digestion step apparently prevents this and presumably some change in the composition of the crude reaction product occurs during the digestion treatment. Whatever the nature of the change may be, it seems clear that it cannot be a change due to conversion of part of the phthalic acid values contained in the crude reaction product to phthalic acids, since the phthalic acids, i. e., isophthalic and terephthalic acids, are less soluble than any of the phthalic acid derivatives contained in the crude reaction product.

The steam stripping of the reaction product prior to decolorization as above described may be conducted prior to or subsequent to the digestion step. The steam stripping accomplishes two results of importance: it permits convenient recovery of ammonia and hydrogen sulfide for use in oxidizing further quantities of xylene, and it accomplishes separation of a liquid sulfur phase and permits the production of a phthalic acid product which is substantially completely free of sulfur impurities.

We claim:

1. In a process for producing phthalic acids by heating a xylene with water, ammonium sulfate, water and an inorganic sulfur compound containing sulfur at a valence below plus 6 to a temperature in the range from 550° F. to 700° F. to produce a reaction product comprising phthalic acid amides and ammonium salts, decolorizing the reaction product by contacting it with a solid adsorbent and separating the reaction product from the adsorbent, the improved method which comprises digesting the reaction product at a temperature below reaction temperature and in the range from about 450° F. to 630° F.

and under an elevated pressure at least equal to that of steam in equilibrium with liquid water at digestion temperature for at least about 2 minutes prior to the decolorization step.

2. A process for producing phthalic acids which comprises heating a xylene with water, ammonium sulfate and a water-soluble sulfide to a temperature in the range from 550° F. to 700° F. to produce a reaction product comprising phthalic acid amides and ammonium salts, digesting the reaction product at a temperature below reaction temperature and in the range from about 450° F. to 550° F. and under an elevated pressure at least equal to that of steam in equilibrium with liquid water at digestion temperature for at least 2 minutes and then decolorizing the digested reaction product by mixing it with a solid adsorbent and filtering the mixture and hydrolyzing the decolorized reaction product to produce phthalic acids.

3. A process for producing phthalic acids which comprises heating a xylene with water, ammonium sulfate and a water-soluble sulfide to a temperature in the range from about 600° F. to about 700° F. to produce a reaction product comprising phthalic acid amides and ammonium salts, digesting the reaction product at about 450° F. to 550° F. and under an elevated pressure at least equal to that of steam in equilibrium with liquid water at digestion temperature for about 2 to 30 minutes, stripping the reaction product with steam at about 250° F. to 350° F. to remove ammonia and hydrogen sulfide and liberate elemental sulfur, separating an aqueous phase and a liquid sulfur phase from the stripped product and then decolorizing the aqueous phase by mixing it with a solid adsorbent and filtering the mixture.

4. A process for producing phthalic acids which comprises heating a xylene with water, ammonium sulfate and a water-soluble sulfide to a temperature from about 550° F. to about 700° F. to produce a reaction product comprising phthalic acid amides and ammonium salts, digesting the reaction product at a temperature from about 450° F. to 630° F. and at a pressure from about the pressure of steam in equilibrium with water at the digestion temperature to a pressure 800 pounds per square inch greater than the pressure of steam in equilibrium with water at digestion temperature for about 2 to 30 minutes, stripping the digested reaction product with steam at about 250 to 350° F. to remove ammonia and hydrogen sulfide and liberate elemental sulfur, separating an aqueous phase and a liquid sulfur phase from the stripped product, decolorizing the aqueous phase by mixing it with a solid adsorbent and filtering the mixture and hydrolyzing the decolorized reaction product to produce phthalic acids.

5. A process for producing phthalic acids which comprises heating a xylene with water, ammonium sulfate and a water-soluble sulfide to a temperature from about 550° F. to about 700° F. to produce a reaction product comprising phthalic acid amides and ammonium salts, digesting the reaction product at a temperature from about 450° F. to 550° F. and at a pressure from about 600 to 1600 p. s. i. g. for 2 to 15 minutes, stripping the digested reaction product with steam at about 250 to 350° F. to remove ammonia and hydrogen sulfide and liberate elemental sulfur, separating an aqueous phase and a liquid sulfur phase from the stripped product, decolorizing the aqueous phase by mixing it with a solid adsorbent and filtering the mixture and hydrolyzing the decolorized reaction product to produce phthalic acids.

6. In a process for decolorizing a mixture of phthalic acid amides, ammonium phthalates and water produced by oxidation of xylenes, wherein the mixture is decolorized by intimately contacting it at elevated temperature with a solid adsorbent and then separating the adsorbent from the decolorized product, the method of reducing losses of phthalic acid values from the filtrate which comprises digesting the mixture at a temperature in the range from about 450° F. to 630° F. under an elevated pressure at least equal to that of steam in equilibrium of liquid water at digestion temperature for at least two minutes prior to the decolorization step.

No references cited.